US012351206B2

(12) United States Patent
Kato et al.

(10) Patent No.: US 12,351,206 B2
(45) Date of Patent: Jul. 8, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Kato, Wako (JP); Nozomu Hirosawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 18/101,138

(22) Filed: Jan. 25, 2023

(65) Prior Publication Data

US 2023/0159051 A1 May 25, 2023

Related U.S. Application Data

(63) Continuation of application No. 17/060,098, filed on Oct. 1, 2020.

(30) Foreign Application Priority Data

Oct. 11, 2019 (JP) .................................. 2019-187679

(51) Int. Cl.
*B60W 60/00* (2020.01)
*B60W 10/20* (2006.01)
(Continued)

(52) U.S. Cl.
CPC .......... *B60W 60/001* (2020.02); *B60W 10/20* (2013.01); *B60W 30/18163* (2013.01);
(Continued)

(58) Field of Classification Search
None
See application file for complete search history.

(56) References Cited

U.S. PATENT DOCUMENTS

2018/0088572 A1* 3/2018 Uchida ............. B60W 60/0057
2019/0047561 A1* 2/2019 Nishiguchi ........... B60W 50/10
(Continued)

FOREIGN PATENT DOCUMENTS

| CN | 110103962 | 8/2019 |
|----|-----------|--------|
| CN | 110239545 | 9/2019 |

(Continued)

OTHER PUBLICATIONS

Japanese Notice of Allowance for Japanese Patent Application No. 2019-187679 mailed Jun. 8, 2021.

(Continued)

*Primary Examiner* — Hunter B Lonsberry
*Assistant Examiner* — Paysun Wu
(74) *Attorney, Agent, or Firm* — Amin, Turocy & Watson, LLP

(57) ABSTRACT

A vehicle control device of the embodiments includes a recognizer, and a driving controller, in which the driving controller includes a lane change controller that changes lanes from a host vehicle traveling lane in which a host vehicle travels to an adjacent lane adjacent to the host vehicle traveling lane, the lane change controller includes a first operation of changing lanes according to a request from an occupant of the host vehicle and a second operation of changing lanes on the basis of a result of recognition, and, when changing lanes is stopped at the time of execution of the first operation, causes the host vehicle to continue traveling in the host vehicle traveling lane and prohibits a lane change by the second operation within a first period including a distance or time from a first time at which changing lanes is stopped.

9 Claims, 9 Drawing Sheets

(51) Int. Cl.
  *B60W 30/18* (2012.01)
  *B60W 50/10* (2012.01)
  *B60W 50/14* (2020.01)
  *G01C 21/00* (2006.01)
(52) U.S. Cl.
  CPC ............ *B60W 50/10* (2013.01); *B60W 50/14* (2013.01); *G01C 21/38* (2020.08); *B60W 2552/53* (2020.02); *B60W 2556/00* (2020.02)

(56) References Cited

U.S. PATENT DOCUMENTS

| | | | |
|---|---|---|---|
| 2019/0084572 A1* | 3/2019 | Oishi | B60Q 1/346 |
| 2019/0143983 A1* | 5/2019 | Hashimoto | G05D 1/0088 |
| | | | 701/23 |
| 2019/0283754 A1 | 9/2019 | Toda | |
| 2021/0261133 A1 | 8/2021 | Sakayori et al. | |
| 2021/0370946 A1 | 12/2021 | Taniguchi et al. | |
| 2022/0203993 A1 | 6/2022 | Taniguchi | |

FOREIGN PATENT DOCUMENTS

| | | |
|---|---|---|
| JP | 2017-178068 | 10/2017 |
| JP | 2019-001184 | 1/2019 |
| JP | 2019-217825 | 12/2019 |
| WO | 2020/230304 | 11/2020 |

OTHER PUBLICATIONS

Non-Final Office Action for U.S. Appl. No. 17/060,098 mailed Mar. 29, 2022.
Final Office Action for U.S. Appl. No. 17/060,098 mailed Sep. 21, 2022.
U.S. Appl. No. 17/060,098, filed Oct. 1, 2020.
Non-Final Office Action for U.S. Appl. No. 17/060,098 mailed Feb. 15, 2023.
Chinese Office Action for Chinese Patent Application No. 202010983895.0 mailed Sep. 20, 2023.

* cited by examiner

VEHICLE CONTROL DEVICE, VEHICLE CONTROL METHOD, AND STORAGE MEDIUM

CROSS-REFERENCE TO RELATED APPLICATIONS

This application is a Continuation of U.S. application Ser. No. 17/060,098 filed on Oct. 1, 2020, the entire contents of which is incorporated herein by reference.

Priority is claimed on Japanese Patent Application No. 2019-187679, filed Oct. 11, 2019, the content of which is incorporated herein by reference.

BACKGROUND

Field of the Invention

The present invention relates to a vehicle control device, a vehicle control method, and a storage medium.

Description of Related Art

In recent years, research on automatically controlling vehicles has advanced. In this regard, a technology for executing control for supporting a lane change to a target lane and prohibiting control for supporting a new lane change to an adjacent lane in a specific direction after the lane change when it is determined that a vehicle will not collide with another vehicle traveling in the target lane is known (for example, Japanese Unexamined Patent Application, First Publication No. 2019-1184).

SUMMARY

However, control when the lane change is not completed has not been considered in the conventional technology. Therefore, there have been many cases in which appropriate driving control cannot be executed.

Aspects of the present invention have been made in consideration of such circumstances, and an object thereof is to provide a vehicle control device, a vehicle control method, and a storage medium that can execute more appropriate driving control.

A vehicle control device, a vehicle control method, and a storage medium according to the present invention have adopted the following configuration.

(1): A vehicle control device according to one aspect of the present invention is a vehicle control device that includes a recognizer configured to recognize a peripheral status of a host vehicle, and a driving controller configured to control one or both of steering and speed of the host vehicle on the basis of the peripheral status recognized by the recognizer or map information, in which the driving controller includes a lane change controller that changes lanes from a host vehicle traveling lane in which the host vehicle travels to an adjacent lane adjacent to the host vehicle traveling lane, the lane change controller performs a first operation of changing lanes according to a request from an occupant of the host vehicle and a second operation of changing lanes on the basis of a result of recognition performed by the recognizer, and, when changing lanes is stopped at the time of execution of the first operation, causes the host vehicle to continue traveling in the host vehicle traveling lane and prohibits a lane change by the second operation within a first period including a distance or time from a first time at which changing lanes is stopped.

(2): In the aspect of (1) described above, when a lane change to another lane present in a direction opposite to an adjacent lane to which a lane change is stopped is performed on the basis of a position of the host vehicle, the driving controller makes the first period shorter than when a lane change is performed to the adjacent lane to which a lane change is stopped.

(3): In the aspect of (1) described above, when a reason for changing lanes to the adjacent lane is guidance to a destination, the driving controller makes the first period shorter than that in the case of another reason.

(4): In the aspect of (1) described above, when a lane change from the host vehicle traveling lane of the host vehicle to the adjacent lane by the first operation is completed, the driving controller suppresses a lane change by the second operation within a second period shorter than the first period from a time of the completion.

(5): In the aspect of (1) described above, an operation receiver configured to receive an intention of a lane change from the occupant is further included, in which the driving controller executes a lane change by the first operation when the operation receiver has received the intention of the lane change.

(6): In the aspect of (1) described above, the second operation includes processing of determining whether it is possible to cause the host vehicle to change lanes from the host vehicle traveling lane to the adjacent lane.

(7): In the aspect of (1) described above, the driving controller changes the first period on the basis of a reason why changing lanes is stopped.

(8): In the aspect of (1) described above, the driving controller further includes a notification controller configured to notify the occupant of the reason why changing lanes is stopped when the lane change is stopped.

(9): In the aspect of (8) described above, the notification controller notifies the occupant that a lane change by the second operation becomes possible when a time for prohibiting the lane change by the second operation has elapsed.

(10): A vehicle control method according to another aspect of the present invention is a vehicle control method that includes, by an in-vehicle computer, recognizing a peripheral status of a host vehicle, controlling one or both of steering and speed of the host vehicle on the basis of the recognized peripheral status or map information, and changing lanes from a host vehicle traveling lane in which the host vehicle travels to an adjacent lane adjacent to the host vehicle traveling lane, in which control for changing lanes includes a first operation of changing lanes according to a request from an occupant of the host vehicle and a second operation of changing lanes on the basis of a result of the recognition of the peripheral status, and, when changing lanes is stopped at the time of execution of the first operation, the host vehicle is caused to continue traveling in the host vehicle traveling lane and a lane change by the second operation is prohibited within a first period including a distance or time from a first time at which changing lanes is stopped.

(11): A storage medium according to still another aspect of the present invention is a computer-readable non-transitory storage medium that has stored a program causing an in-vehicle computer to execute recognizing a peripheral status of a host vehicle, controlling one or both of steering and speed of the host vehicle on the basis of the recognized peripheral status or map information, and changing lanes from a host vehicle traveling lane in which the host vehicle travels to an adjacent lane adjacent to the host vehicle traveling lane, in which control for changing lanes includes a first operation of changing lanes according to a request from an occupant of the host vehicle and a second operation of changing lanes on the basis of a result of the recognition of a peripheral status, and, when changing lanes is stopped at the time of execution of the first operation, the host vehicle is caused to continue traveling in the host vehicle traveling lane and a lane change by the second operation is prohibited within a first period including a distance or time from a first time at which changing lanes is stopped.

According to the aspects of (1) to (11) described above, it is possible to execute more appropriate driving control.

DESCRIPTION OF EMBODIMENTS

Hereinafter, embodiments of a vehicle control device, a vehicle control method, and a storage medium of the present invention will be described with reference to the drawings. In the following description, an embodiment in which the vehicle control device is applied to an automated driving vehicle will be described as an example. Automated driving is, for example, to execute driving control by automatically controlling one or both of steering and speed of a vehicle. Examples of the driving control described above may include, for example, driving control such as an adaptive cruise control system (ACC), a traffic jam pilot (TJP), an automated lane change (ALC), a lane keeping assistance system (LKAS), and a collision mitigation brake system (CMBS). ALC includes a first operation of changing lanes according to a request from an occupant of a host vehicle and a second operation of changing lanes on the basis of a result of recognition by a recognizer to be described below. The second operation may include processing of determining whether it is possible to cause the host vehicle to change lanes. In the automated driving vehicle, driving control (so-called manual driving) by a manual operation of the occupant may be executed. In the following description, a left-hand traffic regulation is applied will be described, but in a case in which a right-hand traffic regulation is applied, left and right may be reversed.

Overall Configuration

Figure 1:
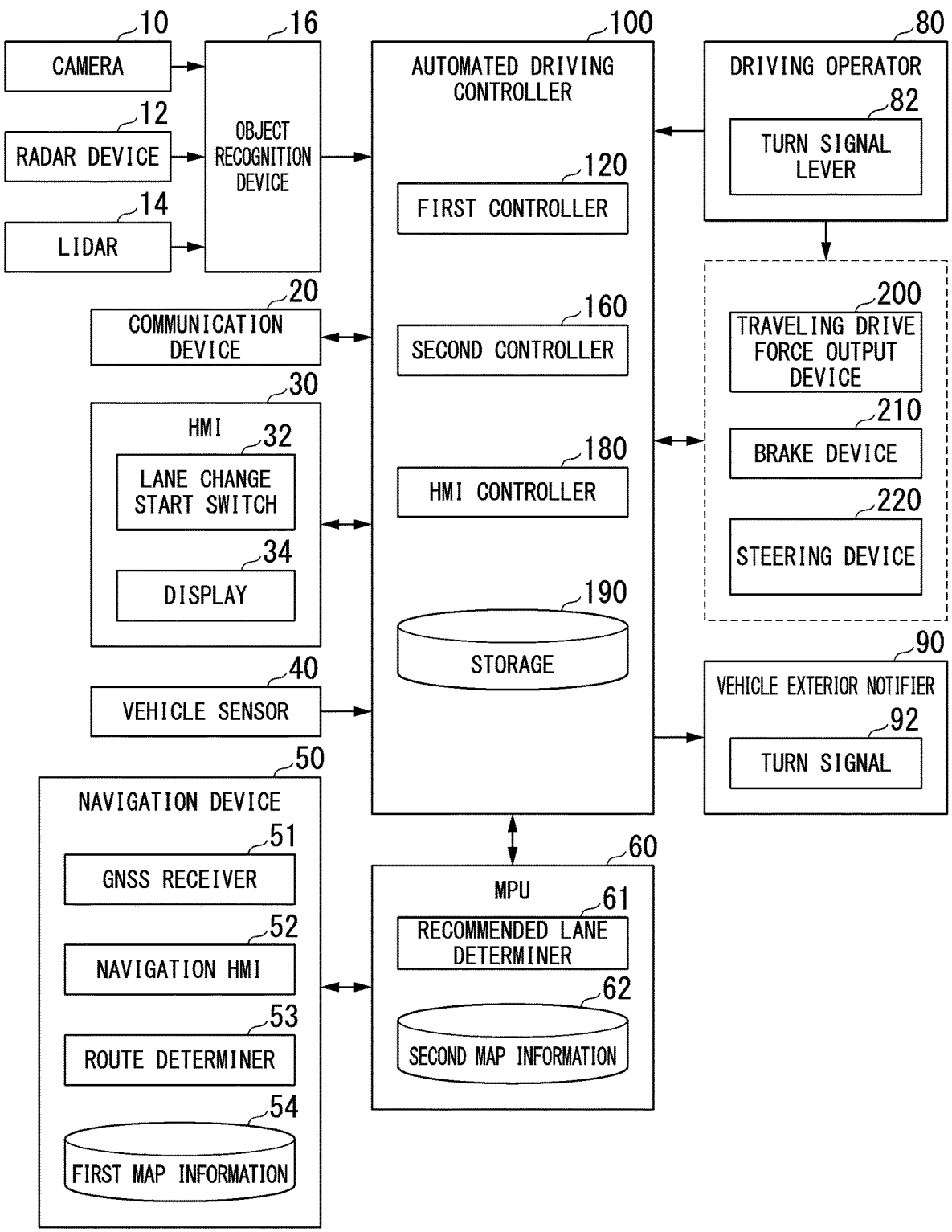
FIG. 1 is a configuration diagram of a vehicle system including a vehicle control device according to an embodiment.

FIG. 1 is a configuration diagram of a vehicle system 1 including a vehicle control device according to an embodiment. A vehicle (hereinafter, referred to as a host vehicle M) in which the vehicle system 1 is mounted is, for example, a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or electric power discharged from batteries (storage batteries) such as a secondary battery and a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, a vehicle exterior notifier 90, an automated driving controller 100, a traveling drive force output device 200, a brake device 210, and a steering device 220. These devices or apparatuses are connected to each other by a multiplex communication line such as a controller area network (CAN) communicator line, a serial communication line, a wireless communication network, or the like. The configuration shown in FIG. 1 is merely an example, and a part of the configuration may be omitted or another configuration may be added. A combination of the HMI 30, the driving operator 80, the automated driving controller 100, and the vehicle exterior notifier 90 is an example of a "vehicle control device." A combination of the HMI 30 and the driving operator 80 is an example of an "operation receiver." The HMI 30 is an example of a "notifier." A combination of the first controller 120 and the second controller 160 in the automated driving controller 100 is an example of a "driving controller," and the HMI controller 180 is an example of a "notification controller."

The camera 10 is, for example, a digital camera using a solid-state imaging device such as a charge coupled device (CCD) or a complementary metal oxide semiconductor (CMOS). The camera 10 is attached to an arbitrary position of a vehicle in which the vehicle system 1 is mounted. When the front is imaged, the camera 10 is attached to an upper part of the front windshield, a back of the rearview mirror, or the like. The camera 10 periodically repeats to image a periphery of the host vehicle M. The camera 10 may also be a stereo camera.

The radar device 12 radiates radio waves such as millimeter waves to the periphery of the host vehicle M, and detects at least a position (a distance and an orientation) of an object by detecting radio waves (reflected waves) reflected by the object. The radar device 12 is attached to an arbitrary part of the host vehicle M. The radar device 12 may detect the position and a speed of the object using a frequency modulated continuous wave (FM-CW) method.

THE LIDAR 14 radiates light to the periphery of the host vehicle M and measures scattered light. The LIDAR 14 detects a distance to a target on the basis of time from light emission and light reception. The radiated light is, for example, pulsed laser light. The LIDAR 14 is attached to an arbitrary part of the host vehicle M.

The object recognition device 16 performs sensor fusion processing on a result of detection performed by some or all of the camera 10, the radar device 12, and the LIDAR 14, and recognizes the position, type, speed, and the like of the object. The object recognition device 16 outputs a result of the recognition to the automated driving controller 100. The object recognition device 16 may output results of detections by the camera 10, the radar device 12, and the LIDAR 14 to the automated driving controller 100 as they are. In this case, the object recognition device 16 may be omitted from the vehicle system 1.

The communication device 20 uses, for example, a cellular network, a Wi-Fi network, a Bluetooth (a registered trademark), a dedicated short range communication (DSRC), a local area network (LAN), a wide area network (WAN), or a network such as the Internet, and communicates with other vehicles present in the periphery of the host vehicle M, a terminal device of a user using the host vehicle M, or various types of server devices.

The HMI 30 notifies an occupant of the host vehicle M of various types of information and receives an input operation from the occupant. The HMI 30 includes, for example, a lane change start switch 32 and a display 34. The lane change start switch 32 is, for example, a switch for executing lane change control for causing the host vehicle M to change lanes using the automated driving controller 100 without depending on a steering operation or an acceleration or deceleration operation performed by the occupant. The steering operation is, for example, an operation for a steering wheel included in the driving operator 80. The acceleration or deceleration operation is, for example, an operation for an accelerator pedal or a brake pedal included in the driving operator 80. As the steering operation and the acceleration or deceleration operation, for example, a joystick, a gesture, a recognition device, or the like may also be used. The lane change control is, for example, ALC control of causing the host vehicle M to change lanes from a traveling lane (a host vehicle traveling lane) to a target adjacent lane by controlling one or both of steering control and speed control of the host vehicle M. The lane change start switch 32 may receive an execution request for a lane change (an intention of a lane change), and may receive information indicating either a right or left direction in which the host vehicle M performs the lane change. The lane change start switch 32 may be, for example, a mechanical switch such as a button or a graphical user interface (GUI) switch displayed on the display 34.

In addition to the lane change start switch 32, The HMI 30 may include an overtaking start switch, a following travel start switch, a lane keeping start switch, and the like. The overtaking start switch is a switch for executing the overtaking control in which the host vehicle M overtakes a preceding vehicle using the automated driving controller 100. The following travel start switch is a switch for executing driving control in which the host vehicle M is caused to follow a preceding vehicle using the automated driving controller 100 without depending on the steering operation or the acceleration or deceleration operation performed by the occupant. The lane keeping start switch is a switch for executing driving control (LKAS control) to keep a traveling lane of the host vehicle M using the automated driving controller 100 without depending on the steering operation performed by the occupant. The HMI 30 may include a switch that switches a start or end of the automated driving.

The display 34 is, for example, various types of display devices such as an liquid crystal display (LCD) or an organic electro luminescence (EL) display. The display 34 is, for example, a meter display provided in a portion of an instrument panel facing a driver, a center display provided in a center of the instrument panel, a head up display (HUD), or the like. The HUD is, for example, a device for causing the occupant to visually recognize an image by superimposing it on a landscape, and, as an example, causes the occupant to visually recognize a virtual image by projecting light including the image onto a front windshield or combiner of the host vehicle M. The display 34 may include, for example, an operation receiver that receives an operation of the occupant, such as a touch panel. The HMI 30 may include a speaker, a buzzer, a touch panel, a key, and the like.

The vehicle sensor 40 includes a vehicle speed sensor that detects the speed of the host vehicle M, an acceleration sensor that detects the acceleration, a yaw rate sensor that detects a yaw rate (for example, a rotation angle speed around a vertical axis that passes through a center of gravity of the host vehicle M), an orientation sensor that detects a direction of the host vehicle M. A result detected by the vehicle sensor 40 is output to the automated driving controller 100.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies a position of the host vehicle M on the basis of a signal received from a GNSS satellite. The GNSS receiver 51 is an example of a "positional information acquirer." The position of the host vehicle M may be identified or supplemented by an inertial navigation system (INS) using an output of the vehicle sensor 40. The navigation HMI 52 includes a display device, a speaker, a touch panel, a key, and the like. The GNSS receiver 51 may also be provided in the vehicle sensor 40. The navigation HMI 52 may be partially or entirely shared with the HMI 30 described above. The route determiner 53 determines, for example, a route (hereinafter, a route on a map) from the position (or an arbitrary input position) of the host vehicle M identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include a point of interest (POI) information, and the like. The route on a map is output to the MPU 60. The navigation device 50 may perform route guidance using the navigation HMI 52 on the basis of the route on a map. The navigation device 50 may transmit a current position and a destination to a navigation server via the communication device 20 and acquire a route equivalent to the route on a map from the navigation server. The navigation device 50 outputs the determined route on a map to the MPU 60.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle M travels in a reasonable route for traveling to a branch destination.

The second map information 62 is map information with higher accuracy than the first map information 54. The second map information 62 includes, for example, the number of lanes, a type of a road marking line, information on a center of a lane, information on a boundary of the lane, or the like. The second map information 62 may include road information, traffic regulation information, address information (addresses/postal codes), facility information, parking lot information, telephone number information, and the like. The road information includes, for example, a radius of curvature (or curvature), a width, a gradient, and the like of a road. The second map information 62 may be updated at any time by the communication device 20 communicating with another device. The first map information 54 and the second map information 62 may be integrally provided as map information. The map information may also be stored in a storage 190.

The driving operator 80 includes, for example, a turn signal lever 82 that causes a turn signal 92 to operate. The driving operator 80 includes, for example, a steering wheel, an accelerator pedal, and a brake pedal. The driving operator 80 may also include a shift lever, a deformed steering, a joystick, and other operators. For example, each operator of the driving operator 80 is attached to an operation detector that detects an operation amount of an operator performed by an occupant or a presence or absence of an operation. The operation detector detects, for example, a position of the turn signal lever 82, a steering angle of the steering wheel, a steering torque, a depression amount of an accelerator pedal or a brake pedal, and the like. Then, the operation detector outputs a result of the detection to the automated driving controller 100, the traveling drive force output device 200, or one or both of the brake device 210 and the steering device 220.

The vehicle exterior notifier 90 includes, for example, a turn signal 92 as an example of a direction indicator. The turn signal 92 includes, for example, a light emitter such as a lamp. The turn signal 92 is provided at an arbitrary position of the host vehicle M (for example, front, rear, left, and right of a body part of the host vehicle M) at which blinking of the light emitter can be recognized from surroundings of the host vehicle M. The turn signal 92 causes the light emitter at a predetermined position to blink, for example, under control of the HMI controller 180. The vehicle exterior notifier 90 may include a speaker for outputting a sound, and cause a sound including information regarding future control (for example, a lane change) by automated driving or manual driving of the host vehicle M to be output from the speaker to be notified outside the vehicle.

The automated driving controller 100 executes automated driving on the basis of a request from the occupant (an occupant request), a request from the vehicle system 1 (a system request), or the like. The automated driving controller 100 may perform control for switching automated driving to manual driving according to a predetermined operation performed by the occupant. The predetermined operation is, for example, an operation in which a steering angle or steering torque of the steering wheel is equal to or larger than a threshold value or an operation in which a depression amount of the accelerator pedal or the brake pedal is equal to or more than a threshold value.

The automated driving controller 100 includes, for example, a first controller 120, a second controller 160, the HMI controller 180, and the storage 190. Each of the first controller 120, the second controller 160, and the HMI controller 180 is realized by, for example, a hardware processor such as a central processing unit (CPU) executing a program (software). Some or all of these components may be realized by hardware (a circuit; including circuitry) such as a large scale integration (LSI), an application specific integrated circuit (ASIC), a field-programmable gate array (FPGA), or a graphics processing unit (GPU), and may also be realized by a cooperation of software and hardware. The program described above may be stored in advance in a storage device (a storage device including a non-transitory storage medium) such as an HDD or a flash memory of the automated driving controller 100, or may be stored in a detachable storage medium such as a DVD, a CD-ROM, or a memory card and installed in the storage device of the automated driving controller 100 by the storage medium (the non-transitory storage medium) being mounted on a drive device, a card slot, or the like.

The storage 190 may be realized by various storage devices described above, an electrically erasable programmable read only memory (EEPROM), a read only memory (ROM), a random access memory (RAM), or the like. The storage 190 stores, for example, various types of information, programs, and the like related to driving control in the embodiment. The storage 190 may store map information (for example, first map information 54 and second map information 62).

Figure 2:
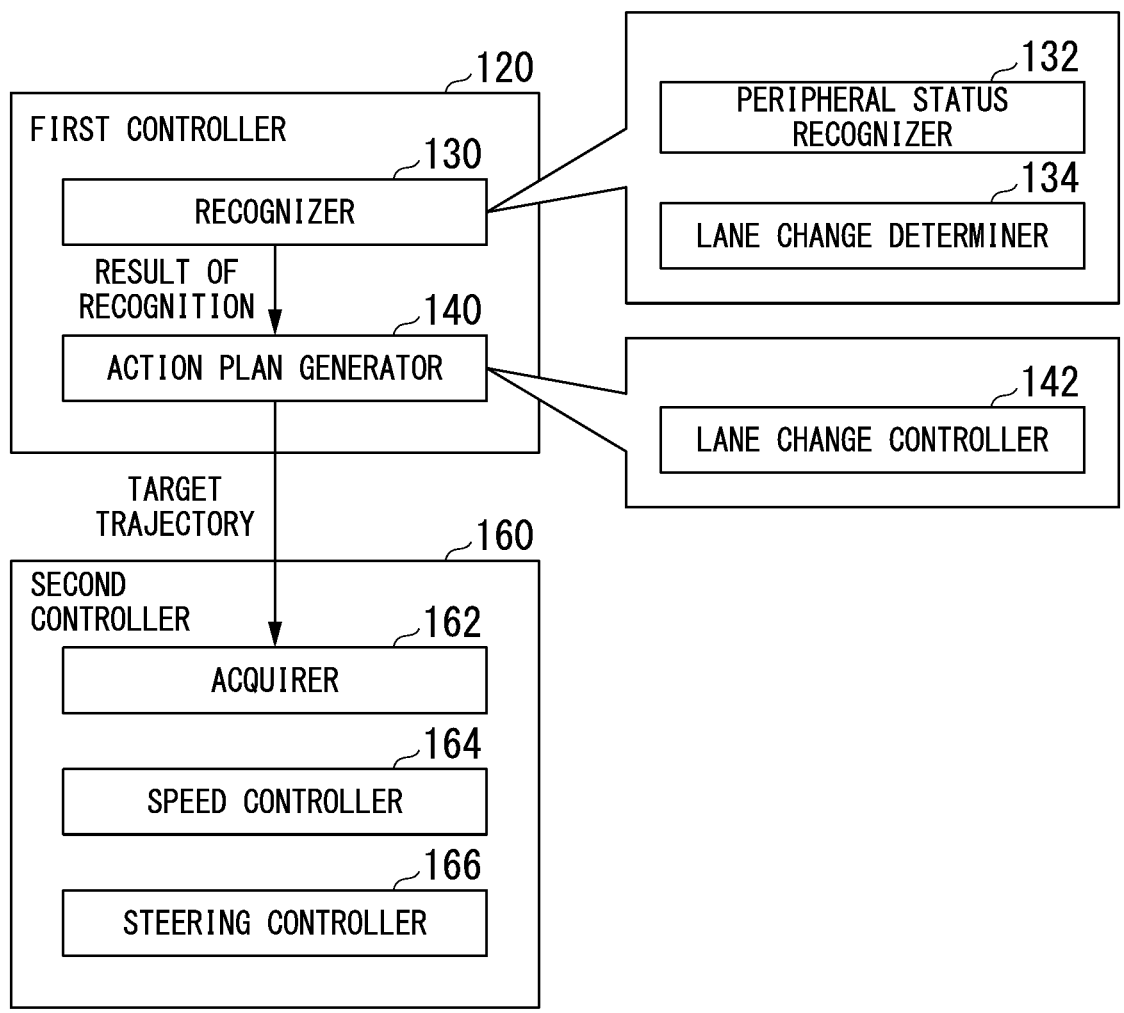
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed. The first controller 120 executes control regarding automated driving of the host vehicle M on the basis of, for example, an instruction from the MPU 60, the HMI controller 180, or the like, or an instruction from a terminal device 300.

The recognizer 130 recognizes a peripheral status of the host vehicle M. The recognizer 130 includes, for example, a peripheral status recognizer 132 and a lane change determiner 134. The peripheral status recognizer 132 recognizes the peripheral status of the host vehicle M on the basis of information to be input from the camera 10, the radar device 12, and the LIDAR 14 via the object recognition device 16. For example, the peripheral status recognizer 132 recognizes states such as a position, a speed, acceleration, and the like of an object present in the periphery of the host vehicle M on the basis of the input information. The position of the object is, for example, recognized as a position on absolute coordinates having the origin at a reference point (a center of gravity, a center of a drive axis, or the like) of the host vehicle M, and is used for control. The position of the object may be represented by a representative point such as a center of gravity or a corner of the object, or may be represented by an expressed area. When the object is a moving body such as another vehicle, the "states" of the object may include the acceleration or jerk of the object, or an "action state" (for example, whether the object is changing lanes or is about to change lanes).

The peripheral status recognizer 132 recognizes, for example, a traveling lane and an adjacent lane of the host vehicle M. For example, the peripheral status recognizer 132 recognizes the traveling lane and the adjacent lane by comparing a pattern of road marking lines obtained from the second map information 62 (for example an array of solid and dashed lines) with a pattern of road marking lines in the periphery of the host vehicle M recognized from an image captured by the camera 10. The peripheral status recognizer 132 may also recognize the traveling lane and the adjacent lane by recognizing not only road marking lines but also traveling road boundaries (road boundaries) including road marking lines, road shoulders, curbs, medians, guardrails, and the like. In this recognition, the position of the host vehicle M acquired from the navigation device 50 and a result of processing performed by INS may be taken into consideration. The peripheral status recognizer 132 recognizes a road marking, a radius of curvature (or curvature) of a road, a gradient of a road, a stop line, an obstacle, a red light, a toll gate, an entrance/exit gate of a parking lot, a stop area, a boarding area, and other road events.

The peripheral status recognizer 132 recognizes the position and posture of the host vehicle M in a traveling lane when the traveling lane is recognized. The peripheral status recognizer 132 may recognize a deviation of a reference point of the host vehicle M from a center of the lane and an angle in a traveling direction of the host vehicle M formed with respect to a line connecting centers of the lane as a relative position and posture of the host vehicle M with respect to the traveling lane. Instead of this, the peripheral status recognizer 132 may also recognize a position r the like of the reference point of the host vehicle M with respect to one of side ends of the traveling lane (a road marking line or a road boundary) as the relative position of the host vehicle M with respect to the traveling lane.

The lane change determiner 134 determines whether it is possible to cause the host vehicle M to change lanes on the basis of a result of recognition performed by the peripheral status recognizer 132. The lane change determiner 134 may also determine whether the lane change of the host vehicle M has been completed. Details of functions of the lane change determiner 134 will be described below.

The action plan generator 140 generates an action plan for causing the host vehicle M to travel according to automated driving. For example, the action plan generator 140 generates a target trajectory in which the host vehicle M travels, in principle, a recommended lane determined by the recommended lane determiner 61, and will further automatically (independently from an operation of a driver) travel in the future to be able to cope with the peripheral status of the host vehicle M on the basis of a result of the recognition by the recognizer 130, a road shape or the like in the periphery based on a current position of the host vehicle M acquired from map information, or the like. The target trajectory includes, for example, a speed element. For example the target trajectory is expressed as a sequential arrangement of points (trajectory points) to be reached by the host vehicle M. The trajectory points are points to be reached by the host vehicle M for each predetermined traveling distance (for example, about several [m]) in a road distance, and, apart from this, a target speed and a target acceleration for each predetermined sampling time (for example, about several decimal numbers [sec]) are generated as a part of the target trajectory. The trajectory points may be positions to be reached by the host vehicle M at a corresponding sampling time for each predetermined sampling time. In this case, information on target speed and target acceleration is expressed by intervals between the trajectory points.

The action plan generator 140 may set an event of automated driving in generating the target trajectory. The event includes, for example, a constant-speed traveling event in which the host vehicle M is caused to travel in the same lane at a constant speed, a following travel event in which the host vehicle M is caused to follow another vehicle (hereinafter, referred to as a preceding vehicle) that is present within a predetermined distance (for example, within 100 [m]) in front of the host vehicle M, and is the closest to the host vehicle M, a lane change event in which the host vehicle M is caused to change lanes from a host lane to an adjacent lane, a branching event in which the host vehicle M is caused to branch to a lane on a destination side at a road branching point, a merging event in which the host vehicle M is caused to merge to a main line at a merging point, a takeover event for ending automated driving and switching it to manual driving, and the like. The event may include, for example, an overtaking event in which the host vehicle M is caused to change lanes to an adjacent lane, to overtake a preceding vehicle in the adjacent lane, and to change lanes to an original lane again, an avoidance event in which the host vehicle M is caused to perform at least one of braking and steering to avoid an obstacle present in front of the host vehicle M, and the like.

For example, the action plan generator 140 may change an event that is already determined for a current section to another event, or may set a new event for the current section according to the peripheral status of the host vehicle M recognized by the peripheral status recognizer 132 when the host vehicle M is traveling. The action plan generator 140 may change an event that is already set for a current section to another event, or may set a new event for the current section according to an operation of the occupant for in-vehicle devices. For example, the action plan generator 140 may change an event that is already set for a current section to the lane change event or may set a new lane change event for the current section when the occupant gives an instruction to cause the turn signal 92 to operate using the lane change start switch 32 or the turn signal lever 82. The action plan generator 140 generates a target trajectory in accordance with a set event.

The action plan generator 140 includes, for example, a lane change controller 142. The lane change controller 142 has a first operation of changing lanes according to a request from the occupant of the host vehicle M and a second operation of changing lanes on the basis of a result of recognition by the recognizer 130. For example, the lane change controller 142 controls execution, suppression, prohibition, stop, or the like of a lane change (the lane change event) on the basis of a result of determination by the lane change determiner 134. Details of functions of the lane change controller 142 will be described below.

The second controller 160 controls the traveling drive force output device 200, the brake device 210, and the steering device 220 such that the host vehicle M passes through the target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140, and stores it in a memory (not shown). The speed controller 164 controls the traveling drive force output device 200 or the brake device 210 on the basis of a speed element associated with the target trajectory stored in the memory. The steering controller 166 controls the steering device 220 in accordance with a bending degree of the target trajectory stored in the memory. Processing of the speed controller 164 and the steering controller 166 is realized by, for example, a combination of feed forward control and feedback control. As an example, the steering controller 166 executes a combination of the feed forward control in accordance with the radius of curvature (or the curvature) of a road in front of the host vehicle M and the feedback control based on a deviation from the target trajectory.

Returning to FIG. 1, the HMI controller 180 notifies the occupant of predetermined information using the HMI 30. The predetermined information includes, for example, information on traveling of the host vehicle M such as information on the state of the host vehicle M and information on driving control. The information on a state of the host vehicle M includes, for example, a speed, an engine RPM, and a shift position of the host vehicle M. The information on driving control includes, for example, a presence or absence of execution of driving control (for example, lane change control) by automated driving, information inquiring whether to start automated driving, information on a driving control status due to the automated driving, and the like. The predetermined information may include information that is not related to the traveling of the host vehicle M such as TV programs and content (for example, a movie) stored in a storage medium such as a DVD. The predetermined information may include, for example, information on a current position, a destination, and a remaining fuel amount of the host vehicle M in automated driving. The HMI controller 180 may output information received by the HMI 30 to the communication device 20, the navigation device 50, the first controller 120, and the like.

The HMI controller 180 may communicate with a terminal device used by the user of the host vehicle M or another external device via the communication device 20, and transmit predetermined information to the terminal device or the another external device. The HMI controller 180 may also cause the HMI 30 to output the information acquired from the terminal device or the another external device.

The HMI controller 180 receives operation contents of the lane change start switch 32 or the turn signal lever 82, which is performed by the occupant, and causes a light emitter of the turn signal 92 to blink on the basis of the received operation contents. The HMI controller 180 ends blinking when a predetermined operation by the driving operator 80 is received or when a predetermined behavior of the host vehicle M is recognized. The HMI controller 180 may control a start and end of blinking of the light emitter of the turn signal 92 on the basis of a system request.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an electronic control unit (ECU) that controls these. The ECU controls the constituents described above according to information input from the second controller 160 or information input from an accelerator pedal of the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the brake pedal of the driving operator 80 such that a brake torque corresponding to a braking operation is output to each wheel. The brake device 210 may include, as a backup, a mechanism that transmits the hydraulic pressure generated by an operation of the brake pedal to the cylinder via a master cylinder. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of a steering wheel by applying a force to, for example, a rack and pinion mechanism. The steering ECU drives an electric motor according to the information input from the second controller 160 or the information input from the steering wheel of the driving operator 80, and changes the direction of the steering wheel.

Driving Control

Next, the driving control of the embodiment will be described in detail. In the following description, control of causing the host vehicle M to change lanes mainly using a first operation or a second operation will be mainly described.

Figure 3:
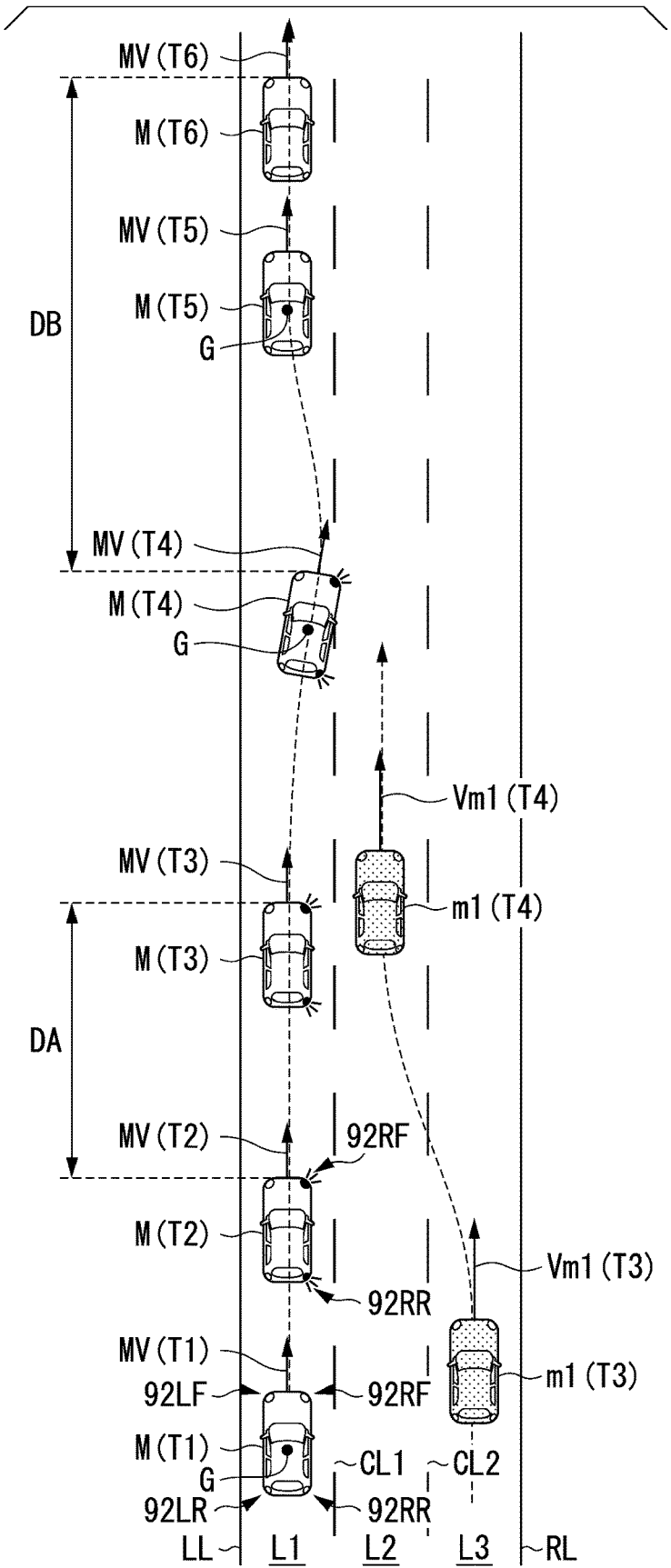
FIG. 3 is a diagram for describing lane change control of the embodiment.

FIG. 3 is a diagram for describing lane change control of the embodiment. The example of FIG. 3 shows a situation in which a lane change is stopped between a start of a lane change by a first operation and completion of the lane change. In the example of FIG. 3, three lanes L1 to L3 that can travel in the same direction are shown. In FIG. 3, the lane L1 is an example of the "host vehicle traveling lane" and is partitioned by marking lines LL and CL1. The lane L2 is an example of the "adjacent lane" and is partitioned by marking lines CL1 and CL2. The lane L3 is partitioned by marking lines CL2 and RL. The marking lines CL1 and CL2 are marking lines showing that a vehicle is allowed to change lanes between left and right lanes partitioned by the respective marking lines. In the example of FIG. 3, the host vehicle M is assumed to be traveling in the lane L1 at a speed VM. Times T1 to T6 represent times when the traveling host vehicle M reaches a corresponding point, and the time T1 is set to be the earliest, followed by the times T2, T3, T4, T5, and T6 in that order. In the example of FIG. 3, the position of the host vehicle M at a time T* is represented by host vehicle M (T*), and the speed is represented by MV (T*). It is assumed that turn signals 92LF and 92RF are disposed on the left and right of the front of a main body of the host vehicle M, and turn signals 92LR and 92RR are disposed on the left and right of the rear side of the main body. The same applies in the following description. In the example of FIG. 3, another vehicle m1 is shown. The other vehicle m1 will be described below.

Figure 4:
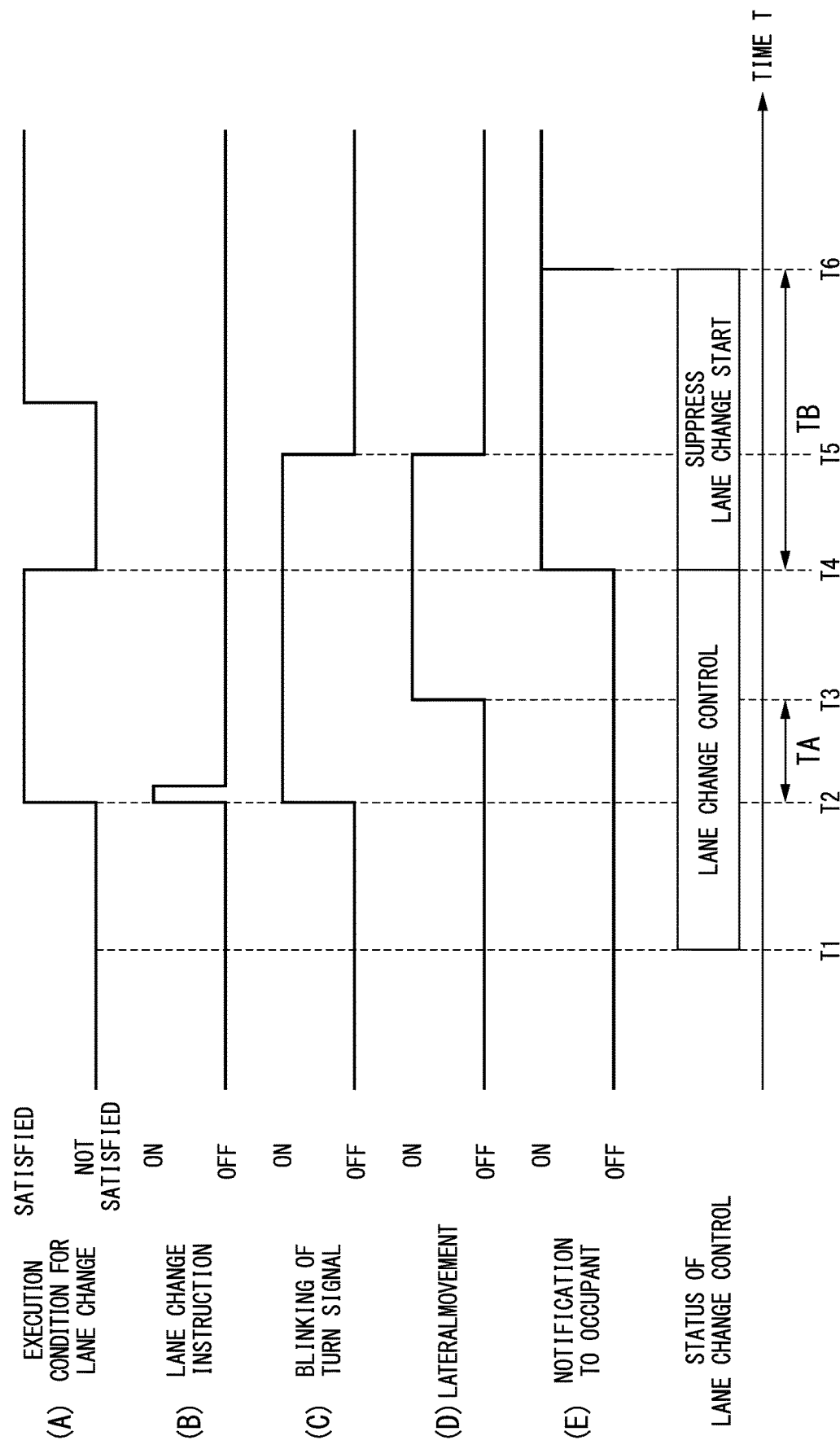
FIG. 4 is a diagram for describing switching timings for various devices or control related to lane change control.

FIG. 4 is a diagram for describing a switching timing of control or various devices related to lane change control. In the example of FIG. 4, as switching of various devices or control at the times T1 to T6, switching timings with respect to elapses of time in cases in which "(A) an execution condition of a lane change is satisfied/not satisfied," "(B) a lane change instruction by the occupant is ON (on) or OFF (oft)," "(C) blinking of the turn signal 92 is ON or OFF," "(D) lateral movement control of a lane change is ON or OFF," and "(E) a notification to the occupant is ON or OFF" are shown. In the example of FIG. 4, a status (an execution status) of the lane change control associated with the switching timing of various devices or control is shown.

The lane change determiner 134 determines whether the host vehicle M can change lanes on the basis of a result of the recognition by the peripheral status recognizer 132, map information, and the like in the first operation and the second operation. For example, the lane change determiner 134 determines whether all the execution conditions for the lane change as shown below are satisfied, determines that the lane change can be executed when all the conditions are satisfied, and determines that the lane change cannot be executed when any one of the conditions is not satisfied.

Execution condition 1: the lane L2 that is a lane change destination has no obstacles (for example, other vehicles that hinder the lane change)

Execution condition 2: a partition line CL that partitions between the lane that is a lane change destination and a host lane is not a road marking that represents prohibition of a lane change (crossing prohibited)

Execution condition 3: the lane that is a lane change destination is recognized

Execution condition 4: a yaw rate detected by a yaw rate sensor included in the vehicle sensor 40 is less than a threshold value Execution condition 5: a radius of curvature of a road on which the vehicle is traveling is equal to or greater than a predetermined value Execution condition 6: a speed of the host vehicle is within a predetermined speed range The lane change determiner 134 determines, for example, whether the execution conditions for changing lanes from the lane L1 to the lane L2 as requested are satisfied at a timing at which a lane change request is received from the occupant in the case of the first operation. When the second operation is executed, the lane change determiner 134 continuously determines whether the execution conditions for the lane change are satisfied, inquires of the occupant about whether to perform a lane change, and performs lane change control on the basis of a result of the inquiry or executes lane change control without depending on an operation of the occupant.

Here, in the examples of FIGS. 3 and 4, it is assumed that a lane change request is received from the occupant at the time T2. For example, it is assumed that the HMI controller 180 receives a lane change request from the occupant when an operation of the turn signal lever 82 or an operation of the lane change start switch 32 is received. The HMI controller 180 may receive the lane change request by a sound input through a microphone included in the HMI 30. At the time T2, the execution conditions of a lane change are satisfied. The HMI controller 180 causes the turn signals 92RF and 92RR indicating a lane change in an instructed direction (to the lane L2 in the example of FIG. 3) to blink.

At the time T2, the lane change controller 142 starts control for causing the host vehicle M to change lanes from the lane L1 to the lane L2. Specifically, the lane change controller 142 sets a target position after the lane change to the lane L2, and performs movement (lateral movement) in a lateral direction (toward the lane L2) with respect to an extending direction of the lanes L1 to L3 to cause the host vehicle M to move to the set target position.

Figure 5:
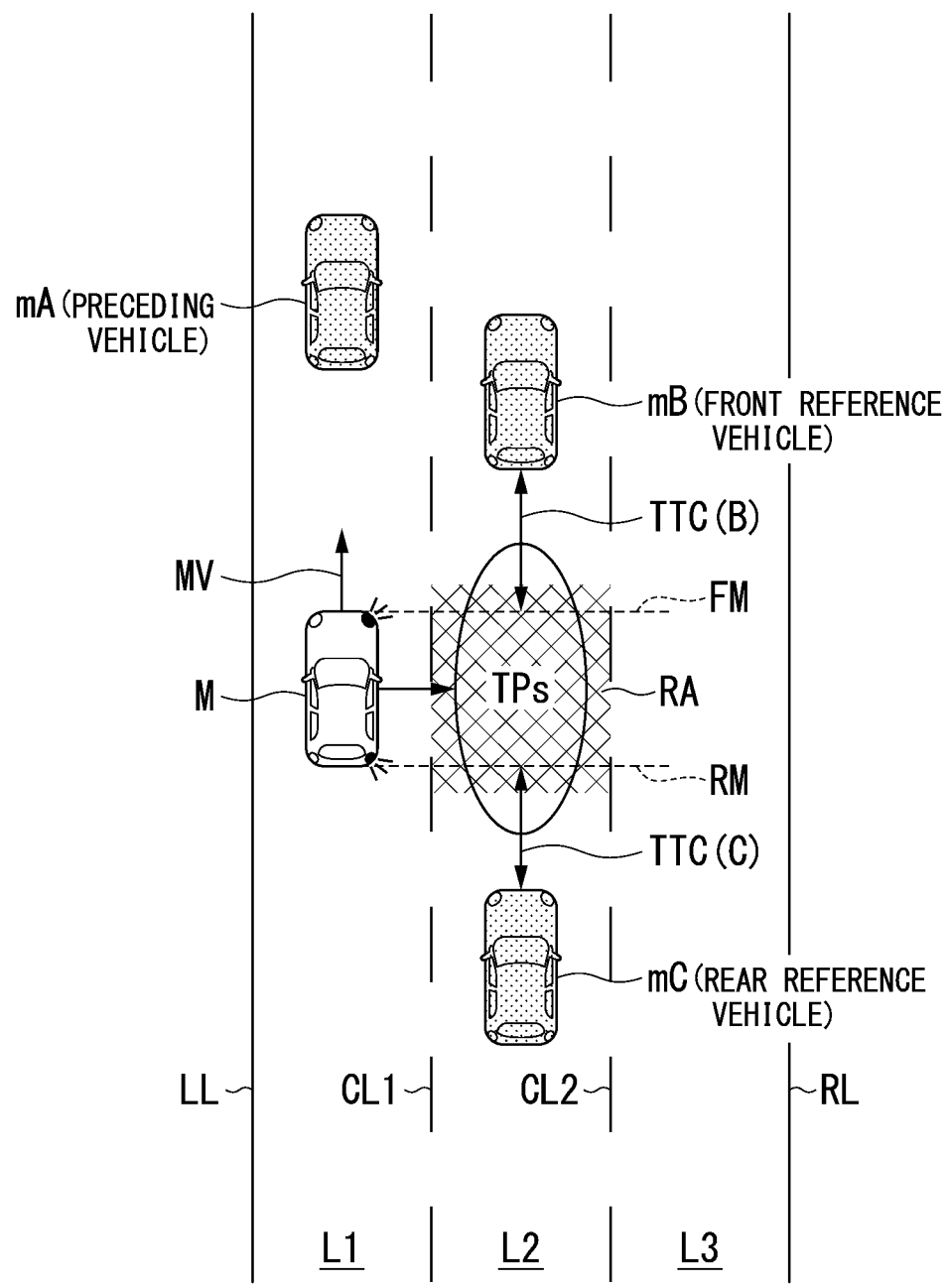
FIG. 5 is a diagram which schematically shows how a lane change target position is set in a lane.

FIG. 5 is a diagram which schematically shows how a lane change target position TPs is set in the lane L2. The lane change controller 142 selects any two vehicles (for example, two vehicles relatively close to the host vehicle M) from peripheral vehicles present in the lane L2, and sets the lane change target position TPs between the selected two peripheral vehicles. For example, the lane change target position TPs is set at a center of the lane L2. In the following description, a peripheral vehicle present immediately in front of the set lane change target position TPs is referred to as a "front reference vehicle MB," and a peripheral vehicle present immediately behind the lane change target position TPs is referred to as a "rear reference vehicle MC." The lane change target position TPs is a relative position based on a positional relationship between the host vehicle M and the front reference vehicle MB and the rear reference vehicle MC.

The lane change controller 142 sets a prohibition area RA as shown in FIG. 5 on the basis of a set position of the lane change target position TPs after the lane change target position TPs is set. For example, the lane change controller 142 projects the host vehicle M onto the lane L2 that is a lane change destination, and sets an area having a slight margin distance in front of and behind the projected host vehicle M as the prohibition area RA. The prohibition area RA is set as an area extending from one marking line CL partitioning the lane L2 to another marking line RL.

Then, the lane change controller 142 confirms the set target position TPs when not even a part of any of the peripheral vehicles is present in the set prohibition area RA, a time-to-collision (TTC) (B) between the host vehicle M and the front reference vehicle MB is larger than a threshold value Th (B), and a time-to-collision TTC (C) between the host vehicle M and the rear reference vehicle MC is larger than a threshold value Th (C). The expression "not even a part of any of the peripheral vehicles is present in the prohibition area RA" means that, for example, the prohibition area RA and an area indicating the peripheral vehicles do not overlap each other when viewed from above. The time-to-collision TTC (B) is derived by, for example, dividing a distance between an extension line FM in which a front end of the host vehicle M is virtually extended toward the lane L2 and the front reference vehicle MB by a relative speed of the host vehicle M to the front reference vehicle MB. The time-to-collision TTC (C) is derived by dividing, for example, a distance between an extension line RM in which a rear end of the host vehicle M is virtually extended toward the lane L2 and the rear reference vehicle MC by a relative speed of the host vehicle M to the rear reference vehicle MC. The threshold values Th (B) and Th (C) may be the same values or may be different values.

The lane change controller 142 confirms a target position by selecting two other vehicles from the peripheral vehicles present in the lane L2 and newly setting a target position TPs when a part of the peripheral vehicles is present in the set prohibition area RA or when the time-to-collision TTC (B) is equal to or less than the threshold value Th (B) or the time-to-collision TTC (C) is equal to or less than the threshold value Th (C). In this case, until the target position TPs is set, the lane change controller 142 may control the speed of the host vehicle M such that a current speed is maintained, or the host vehicle M may be accelerated or decelerated such that it moves toward the target position TPs.

The lane change controller 142 sets the target position TPs on the basis of the speed MV of the host vehicle M, a road shape, or the like when there are no peripheral vehicles in the lane L2, and when there is only one peripheral vehicle in the lane L2, sets the lane charge target position TPs at any position in front of or behind the peripheral vehicle.

The lane change controller 142 generates a target trajectory for causing the host vehicle M to move to the set target position TPs, and causes the host vehicle M to travel along the generated target trajectory. In this case, the lane change controller 142 does not perform lateral movement for a lane change but generates a target trajectory for performing lateral movement to the lane L2 side afterward until a predetermined waiting distance DA is traveled from a point at which the turn signals 92RF and 92RR start blinking, or until a predetermined waiting time TA elapses from the point at which the turn signals 92RF and 92RR start blinking. By maintaining traveling in the lane L1 until a predetermined waiting distance DA or a predetermined distance TA elapses from blinking of the turn signals 92RF and 92RR, it is possible to make it easy for the host vehicle M to change lanes and to allow observers (for example, the peripheral vehicles) to recognize a lane change destination before the lateral movement for a lane change is started. The lane change controller 142 causes the host vehicle M to start a lane change to the lane L2 including the lateral movement at the time T3.

Here, the lane change controller 142 performs control for stopping a lane change when the execution conditions for the lane change by the lane change determiner 134 are not satisfied until the lane change is completed. The example of FIG. 3 shows a situation in which the other vehicle m1 traveling in the lane L3 at a speed Vm1 (T3) at the time T3 has changed lanes to the lane L2 that is the same as a lane change destination while approaching the host vehicle M before reaching the time T4. In this situation, the lane change determiner 134 determines that it is not possible to cause the host vehicle M to change lanes to the lane L2 because the execution condition 1 for the lane change described above is not satisfied at the time T4.

The lane change controller 142 stops the lane change when the lane change determiner 134 determines that it is not possible to perform the lane change before the lane change to the lane L2 by the host vehicle M is completed. In this case, the lane change controller 142 causes the host vehicle M to continue traveling in the lane L1 and prohibits a lane change by the second operation within a first period including a distance or a time from a time (a first time) at which the lane change is stopped.

Specifically, the lane change controller 142 executes the lateral movement of the host vehicle M such that a reference point (for example, a center of gravity G or the center) of the host vehicle M passes through the center of the lane L1 as shown in FIG. 3. In the examples of FIGS. 3 and 4, the reference point of the host vehicle M is positioned to pass through the center of the lane L1 and the blinking of the turn signal 92 ends at the time T5. As a result, it is possible to avoid contact between the host vehicle M1 and the other vehicle M1.

The lane change controller 142 causes the host vehicle M to continue traveling in the lane L1 (to continue LKAS control), and prohibits the lane change by the second operation from the first time (the time T4) at which it has stopped causing the host vehicle M to change lanes to a second time (the time T6) at which a predetermined waiting time TB elapses therefrom. The predetermined waiting time TB is an example of a "first predetermined time." The predetermined waiting time TB may also be a time from the time T5 to the time T6.

The lane change controller 142 may prohibit the lane change by the second operation until the predetermined waiting distance DB, instead of the predetermined waiting time TB, is traveled from the first point (a point at which the host vehicle M is present at the time T4) at which it has stopped causing the host vehicle M to change lanes. The predetermined waiting distance DB is an example of a "first predetermined distance." The expression "within a first period" described above includes, for example, "within a first predetermined time" or "within a first predetermined distance." The lane change controller 142 may also suppress the lane change by the second operation from starting until a predetermined distance is traveled from a point (a point at which the host vehicle M is present at the time T5) at which the reference point of the host vehicle M is positioned at the center of the original lane L1 after the lane change is stopped.

In this manner, it is possible to suppress lane change control from being executed a plurality of times in a short period by suppressing a start of a lane change until the predetermined waiting time TB elapses or the predetermined waiting distance DB is traveled even if the execution conditions for the lane change are satisfied again after the lane change controller has stopped causing the host vehicle M to change lanes. It is possible to suppress the vehicle system from inquiring of the occupant about whether to perform the lane change within a predetermined period despite a lane change caused by a request from the occupant having been stopped.

Figure 6:
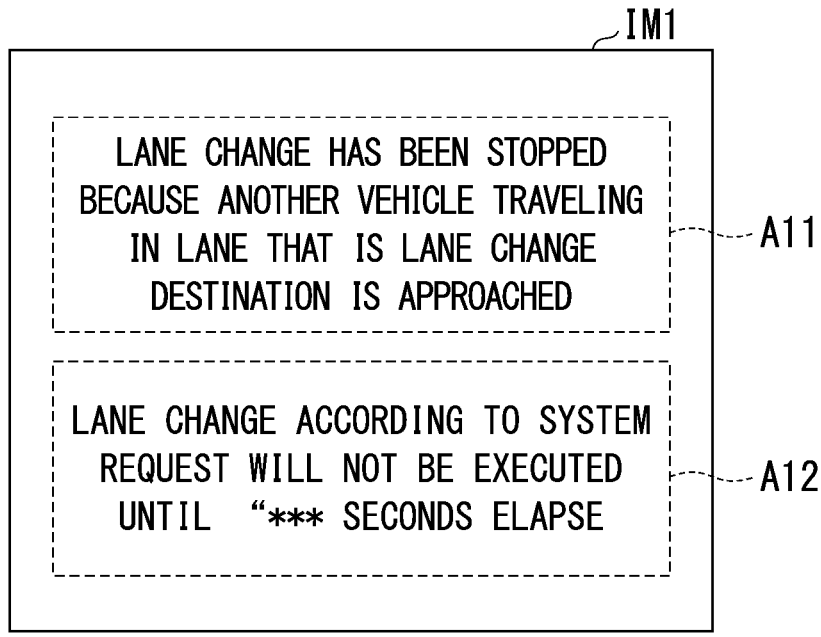
FIG. 6 is a diagram which shows an example of an image including information indicating a reason for having stopped causing a host vehicle to change lanes.

When the HMI controller 180 has stopped causing the host vehicle M to change lanes, the HMI controller 180 generates notification information including a reason for the stop, and outputs the generated notification information from the HMI 30 to notify the occupant of the host vehicle M. FIG. 6 is a diagram which shows an example of an image IM1 including information indicating the reason for having stopped causing the host vehicle M to change lanes. A layout of the image IM1 and a display mode of displayed content or the like are not limited to the following examples. The same applies to description of subsequent images. The image IM1 shown in FIG. 6 includes, for example, a first display area A11 and a second display area A12. The first display area A11 displays information including a reason why driving control executed by automated driving is stopped. In the example of FIG. 6, the first display area A11 displays text information indicating "The lane change has been stopped because another vehicle traveling in the lane that is a lane change destination is approaching." The second display area A12 displays information indicating that start of the lane change by the second operation is suppressed for a predetermined time. In the example of FIG. 6, the second display area A12 displays text information indicating "A lane change due to a system request will not be executed until '* seconds' have elapsed." The part "* seconds" may be a fixed value or the number of seconds to be counted down according to a remaining time. The HMI controller 180 causes the display 34 to display the image IM1 at a time (the time T4) at which the execution conditions for a lane change are not satisfied and causing the host vehicle M to change lanes is stopped. The information displayed in the first display area A11 and the information displayed in the second display area A12 may also be displayed in different images.

The HMI controller 180 may generate a sound associated with the notification information displayed in the image IM1 and output the generated sound through the speaker of the HMI 30. The same applies to subsequent images.

Figure 7:
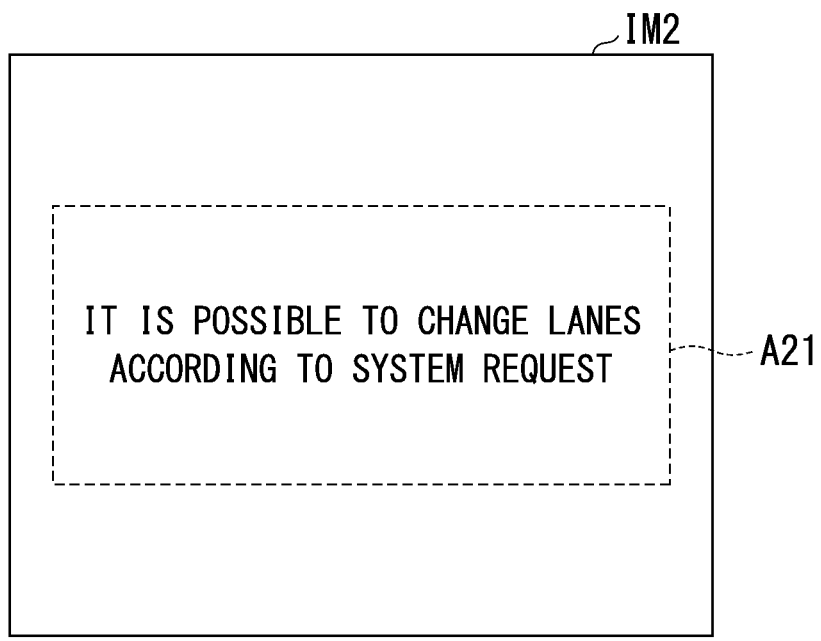
FIG. 7 is a diagram which shows an example of an image indicating that it is possible to change lanes by a second operation.

The HMI controller 180 generates notification information indicating that it is possible to change lanes by the second operation at a time (for example, the time T6) at which a time for suppressing the host vehicle M from changing lanes by the second operation has elapsed, and notifies the occupant of the generated notification information by outputting it from the HMI 30. FIG. 7 is a diagram which shows an example of an image IM2 indicating that it is possible to change lanes by the second operation. In the image IM2 shown in FIG. 7, for example, a third display area A21 is included. Information regarding driving control that is released from suppression is displayed in the third display area A21. In the example of FIG. 7, text information indicating "It is possible to change lanes according to a system request" is displayed in the third display area A21. The HMI controller 180 causes, for example, the display 34 to display the image IM2 until a predetermined time elapses from the time T6.

The lane change controller 142 may also cause the host vehicle M to change lanes using the first operation without suppressing the lane change when a lane change request from the occupant is received between the time T4 and the time T6. As a result, it is possible to cause the host vehicle M to change lanes by prioritizing a request operation (intention) of the occupant of the host vehicle M without waiting for an elapse of a first period.

Change of First Period

Figure 8:
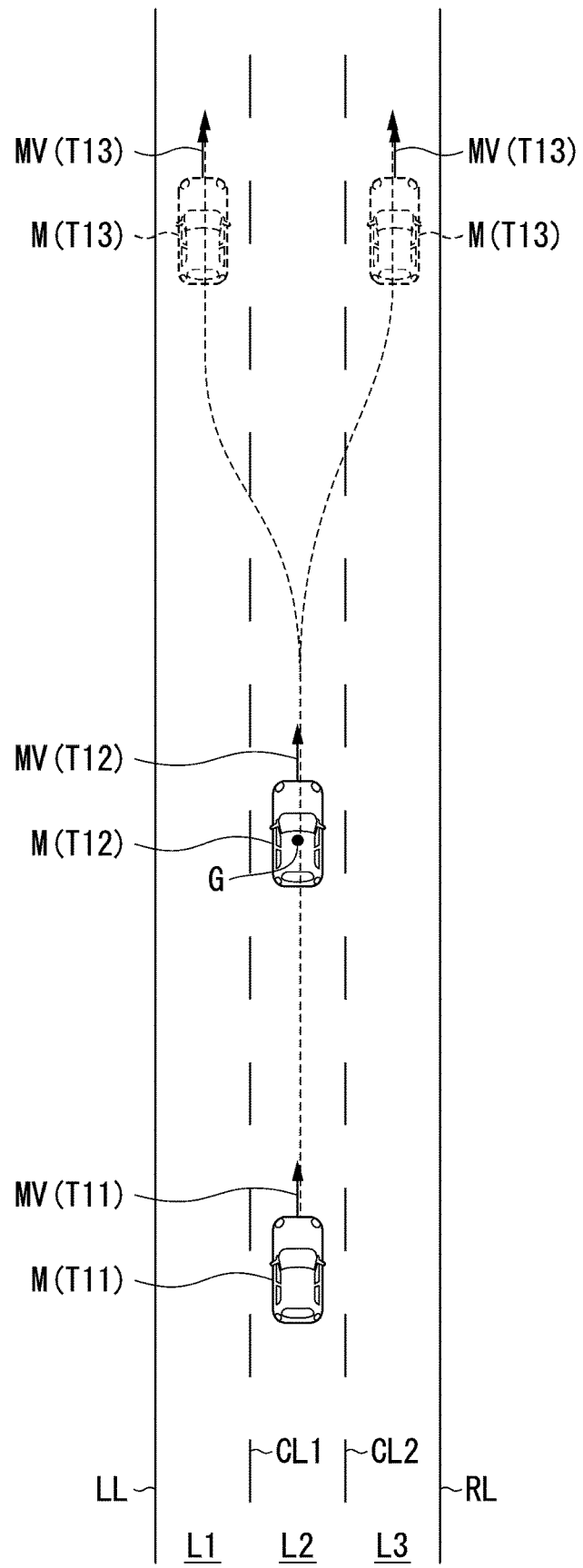
FIG. 8 is a diagram for describing a change of a predetermined waiting time or a predetermined waiting distance.

The lane change controller 142 may change or set the first period described above on the basis of a traveling status, a road status, or the like of the host vehicle M. For example, the lane change controller 142 changes the first period in a lane change after the lane change once enters a stopped state. A specific example of changing or setting the first period (a predetermined waiting time TB or a predetermined waiting distance DB) will be described below. FIG. 8 is a diagram for describing changing the predetermined waiting time TB or the predetermined waiting distance DB. In the example of FIG. 8, times T11 to T13 represent times when the traveling host vehicle M has reached corresponding points, and it is assumed that the time T11 is the earliest, followed by the times T12 and T13 in that order. In the example of FIG. 8, it is assumed that the lane L2 is the "host vehicle traveling lane" and the lane L3 is the "adjacent lane." In the example of FIG. 8, a state in which a lane change from the lane L2 to the lane L3 is started at the time of T11, and the lane change is stopped at the time T12 when the lane change determiner 134 determines that the execution conditions for the lane change are not satisfied is shown.

In this case, when a lane change to another lane L1 (an adjacent lane on the left side in the example of FIG. 8) present in a direction opposite to an adjacent lane (an adjacent lane on the right side in the example of FIG. 8) L3 to which a lane change is stopped is performed on the basis of a position of the host vehicle M, the lane change controller 142 makes the first period shorter than when a lane change to the lane L3 to which a lane change is stopped is performed again. Making the first period shorter may include eliminating the first period. In this manner, it is possible to perform appropriate lane change control according to a lane change destination by adjusting the predetermined waiting time TB or the predetermined waiting distance DB according to a direction in which a lane change is performed.

When a reason for changing lanes is, for example, guidance to a destination set by the navigation device 50 (guidance to reach the destination), the lane change controller 142 may also make the first period (the predetermined waiting time TB or the predetermined waiting distance DB) shorter than in the case of another reason. Another reason includes, for example, reasons for which no problems occur even if a lane change is not executed, such as a lane change for passing a preceding vehicle. When the reason for changing lanes is to go to a destination, it is possible to advance a timing for changing lanes by shortening the predetermined waiting time TB or the predetermined waiting distance DB and to more reliably change lanes. It is possible to change a route for arriving at a destination without executing a lane change or to reduce a significant delay in arrival time at a destination.

The lane change controller 142 may also set the predetermined waiting time TB and the predetermined waiting distance DB on the basis of the reason for having stopped causing the host vehicle M to change lanes from the host vehicle traveling lane to the adjacent lane. For example, when a speed VM of the host vehicle M that follows the preceding vehicle is decreased as the speed of the preceding vehicle is decreased, and a condition of the "execution condition 6" described above is not satisfied, the lane change controller 142 sets the predetermined waiting time TB or the predetermined waiting distance DB to be shorter than in the case of another reason. When a condition of the "execution condition 1" described above is not satisfied because an interrupting vehicle is approaching, the lane change controller 142 sets the predetermined waiting time TB or the predetermined waiting distance DB to be shorter than in the case of another reason (for example, conditions of execution conditions 2 to 5 are not satisfied). The lane change controller 142 may set the predetermined waiting time TB and the predetermined waiting distance DB to be longer than a reference value when a peripheral status recognized by the peripheral status recognizer 132 does not match the peripheral status of the host vehicle M acquired from the map information.

The lane change controller 142 may also set one or both of the predetermined waiting time TB and the predetermined waiting distance DB described above on the basis of the speed VM of the host vehicle M. In this case, the lane change controller 142 sets the predetermined waiting time TB and the predetermined waiting distance DB to be longer as the speed becomes faster.

The lane change controller 142 may also set one or both of the predetermined waiting time TB and the predetermined waiting distance DB on the basis of a road type or road status of a road on which the host vehicle M travels. The road type is, for example, a type such as a highway, a toll road, or a general road. The road status is, for example, a degree of traffic congestion, the number of lanes, a radius of curvature of a road, a degree of gradient, and the like. For example, when the host vehicle is traveling on a highway, the lane change controller 142 changes one or both of the predetermined waiting time TB and the predetermined waiting distance DB to be longer than when the host vehicle is traveling on a toll road or a general road. The lane change controller 142 sets one or both of the predetermined waiting time TB and the predetermined waiting distance DB to be longer as a degree of traffic congestion on a road increases.

When the lane change controller 142 has finished causing the host vehicle M to change lanes by, for example, the first operation, it may suppress a lane change by the second operation within a second period shorter than the first period from the completion. The second period includes, for example, a predetermined waiting time (hereinafter referred to as a predetermined waiting time TC) or a predetermined waiting distance (hereinafter referred to as a predetermined waiting distance DC). When the lane change is completed, since it is highly likely that conditions for performing a next lane change are satisfied, it is possible to more appropriately change lanes even though the predetermined waiting time TC or the predetermined waiting distance DC is set to be shortened.

The lane change controller 142 may also change the predetermined waiting times TA and TC or the predetermined waiting distances DA and DC instead of (or in addition to) the predetermined waiting time TB or the predetermined waiting distance DB. In this manner, it is possible to execute driving control at an appropriate timing by changing the predetermined waiting time or the predetermined waiting distance on the basis of the traveling status, road status, or the like of the host vehicle M.

Processing Flow

Figure 9:
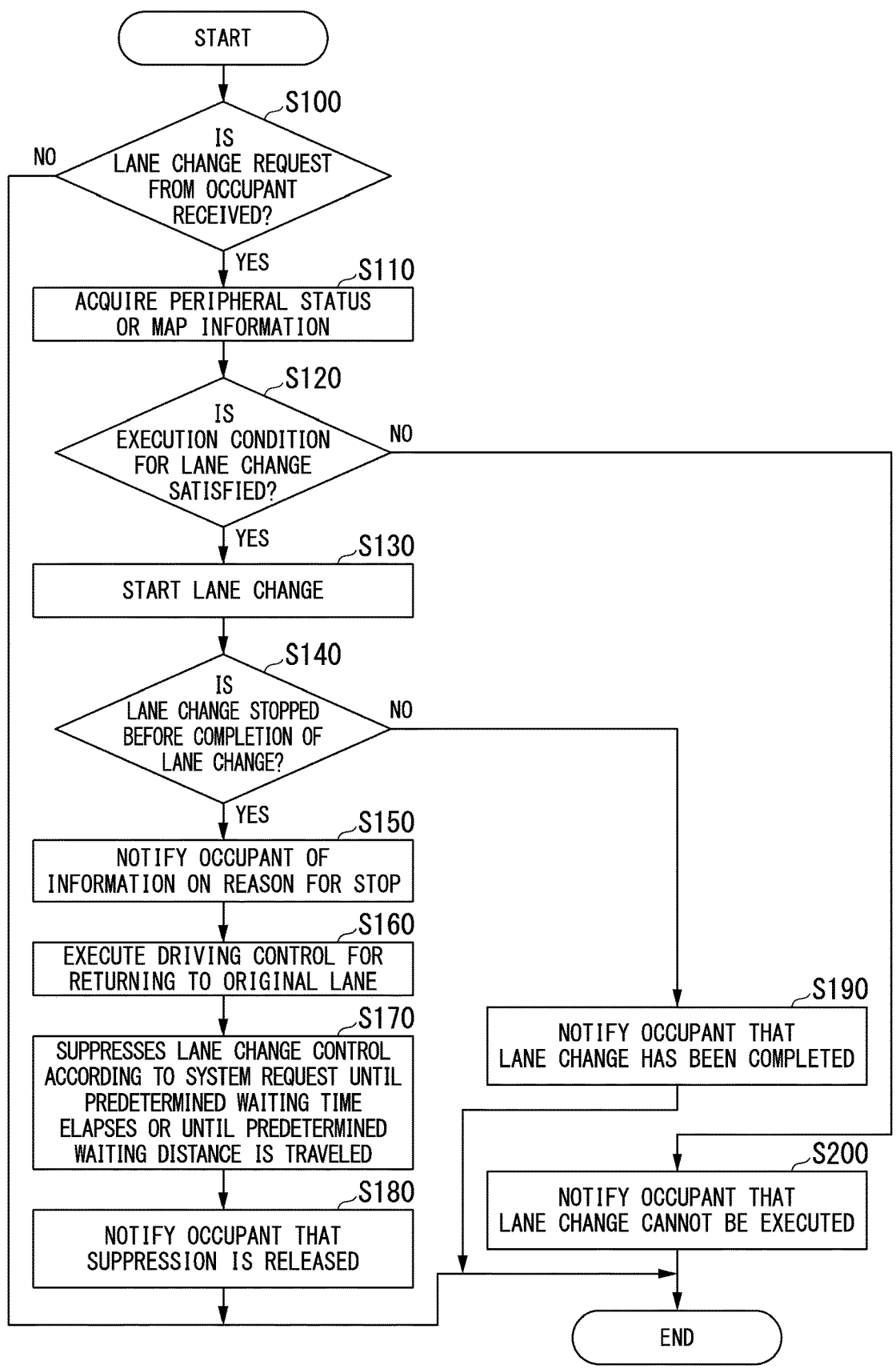
FIG. 9 is a flowchart which shows an example of a flow of processing executed by an automated driving controller according to the embodiment.

FIG. 9 is a flowchart which shows an example of a flow of processing executed by the automated driving controller 100 of the embodiment. In the following description, a flow of processing of driving control including lane change control by the first operation will be mainly described. The processing shown in FIG. 9 is repeatedly executed while automated driving by the automated driving controller 100 is executed.

In the processing of FIG. 9, the lane change determiner 134 determines whether a lane change instruction according to an operation of the lane change start switch 32 or the turn signal lever 82 by the occupant is received (step S100). When the lane change request by the occupant is received, the lane change determiner 134 acquires the peripheral status recognized by the peripheral status recognizer 132, map information (the first map information 54, the second map information 62), or the like (step S110), and determines whether the execution conditions for a lane change to an adjacent lane according to the lane change request are satisfied on the basis of the acquired peripheral status or map information (step S120).

When it is determined that the execution conditions for a lane change are satisfied, the lane change controller 142 starts control for causing the host vehicle M to change lanes (step S130). Next, the lane change controller 142 determines whether to stop a lane change before completion of the lane change (step S140). In processing of step S140, the lane change controller 142 determines to stop a lane change before the completion of the lane change when the lane change determiner 134 determines that the execution conditions for the lane change are not satisfied (in other words, when it is determined that stopping conditions for the lane change are satisfied) before the completion of the lane change to a target lane. When it is determined to stop a lane change before the completion of the lane change, the HMI controller 180 notifies the occupant of information regarding a reason for the stop (step S150). Next, the lane change controller 142 executes driving control for the host vehicle M to return to the center of an original lane (step S160), and suppresses lane change control according to a system request until a predetermined waiting time elapses or until a predetermined waiting distance is traveled (step S170). In processing of step S170, when there is a lane change request from the occupant before the predetermined waiting time elapses or before the predetermined waiting distance is traveled, lane change control is started by giving priority to an intention of the occupant.

Next, the HMI controller 180 notifies the occupant of information indicating that suppression is released by outputting it from the HMI 30 after a predetermined time has elapsed or a predetermined distance has been traveled since the suppression was started (step S180).

In the processing of step S140, when it is determined not to stop a lane change before the completion of the lane change, the HMI controller 180 notifies the occupant of information indicating that the lane change has been completed by outputting it from the HMI 30 after the lane change control by the lane change controller 142 has been completed (step S190). In processing of step S120, when it is determined that the execution conditions for a lane change are not satisfied, the lane change controller 142 does not execute control for causing the host vehicle M to change lanes. In this case, the HMI controller 180 notifies the occupant of information indicating that the lane change cannot be executed by outputting it from the HMI 30 (step S200). In processing of step S200, information regarding a reason why the lane change cannot be executed may also be notified of. Accordingly, the processing of this flowchart ends. In processing of step S100, when it is determined that a lane change request is not received from the occupant, the processing of this flowchart ends.

According to the embodiments described above, for example, the automated driving controller 100 includes a recognizer 130 configured to recognize a peripheral status of a host vehicle, and a driving controller (the first controller 120, the second controller 160) configured to control one or both of steering and speed of the host vehicle M on the basis of the peripheral status recognized by the recognizer 130 or map information, the driving controller includes a lane change controller that causes a vehicle M to change lanes from a host vehicle traveling lane in which the vehicle M travels to an adjacent lane adjacent to the host vehicle traveling lane, the lane change controller has a first operation of changing lanes according to a request from an occupant of the host vehicle and a second operation of changing lanes on the basis of a result of recognition performed by the recognizer 130, and, when changing lanes is stopped at the time of execution of the first operation, causes the host vehicle to continue traveling in the host vehicle traveling lane and prohibits a lane change by the second operation within a first period including a distance or time from a first time at which changing lanes is stopped, and thereby it is possible to execute more appropriate driving control.

Specifically, according to the embodiments, for example, even if a lane change according to a request from the occupant is stopped, it is possible to suppress suggesting a lane change from a system side within a predetermined time after the stop. According to the embodiments, it is possible to suppress lane change control from starting several times within a predetermined time after the stop.

Hardware Configuration

Figure 10:
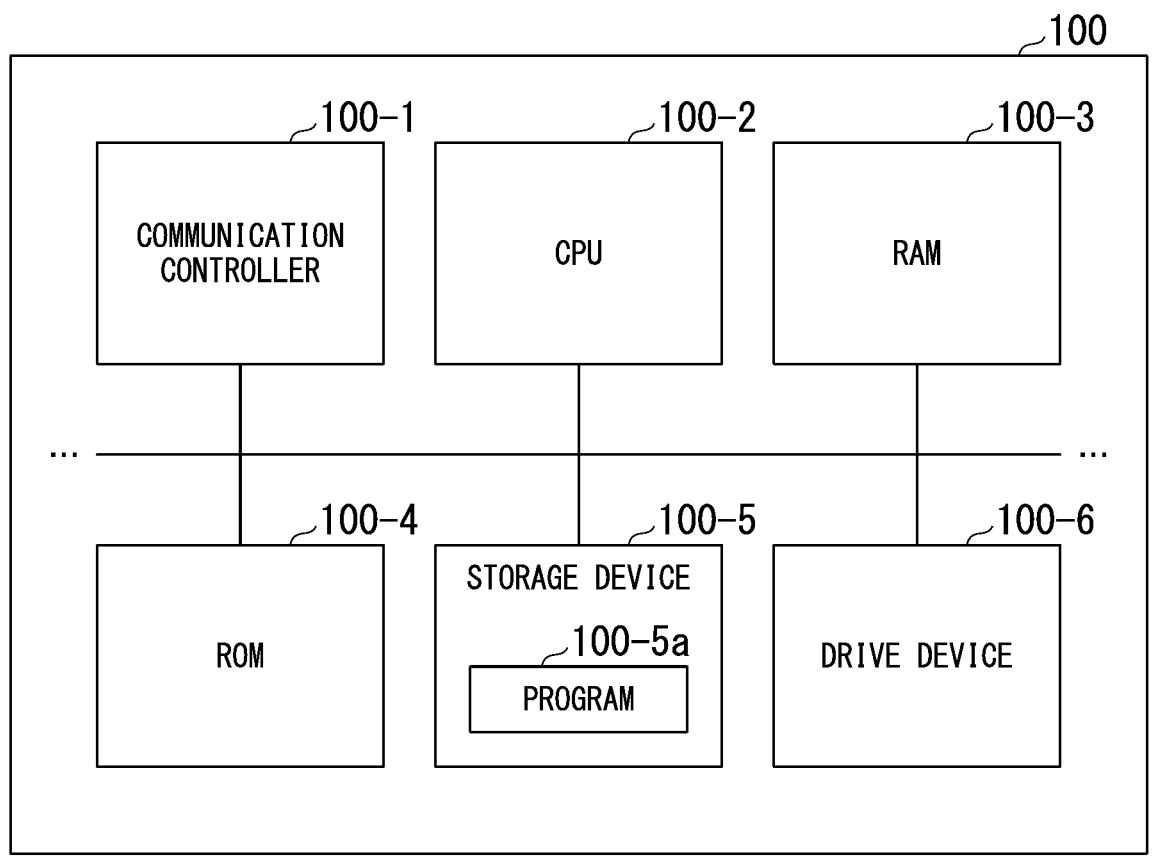
FIG. 10 is a diagram which shows an example of a hardware configuration of the automated driving controller according to the embodiment.

FIG. 10 is a diagram which shows an example of a hardware configuration of the automated driving controller 100 of the embodiment. As shown in FIG. 10, a computer of the automated driving controller 100 is configured by a communication controller 100-1, a CPU 100-2, an RAM 100-3 used as a working memory, a ROM 100-4 for storing a booting program, a storage device 100-5 such as a flash memory or an HDD, a drive device 100-6, and the like being connected to each other by an internal bus or a dedicated communication line. The communication controller 100-1 communicates with components other than the automated driving controller 100. A portable storage medium such as an optical disc (for example, a computer-readable non-transitory storage medium) is attached to the drive device 100-6. The storage device 100-5 stores a program 100-5a executed by the CPU 100-2. This program is expanded in the RAM 100-3 by a direct memory access (DMA) controller (not shown) or the like, and executed by the CPU 100-2. The program 100-5a to which the CPU 100-2 refers may be stored in the portable storage medium attached to the drive device 100-6, and may also be downloaded from another device via a network. As a result, a part or all of components of the automated driving controller 100 are realized.

The embodiments described above can be expressed as follows.

The vehicle control device is configured to include a storage device that stores a program, and a hardware processor, in which the hardware processor executes the program stored in the storage device, and thereby recognizing a peripheral status of a host vehicle, controlling one or both of steering and speed of the host vehicle on the basis of the recognized peripheral status or map information, and changing lanes from a host vehicle traveling lane in which the host vehicle travels to an adjacent lane adjacent to the host vehicle traveling lane, in which the control for changing lanes has a first operation of changing lanes according to a request from an occupant of the host vehicle and a second operation of changing lanes on the basis of a result of the recognition performed by the recognizer, and, when changing lanes is stopped at the time of execution of the first operation, causes the host vehicle to continue traveling in the host vehicle traveling lane and prohibits lane change by the second operation within a first period including a distance or time from a first time at which the lane change changing lanes is stopped.

A mode for implementing the present invention has been described using the embodiment. However, the present invention is not limited to such an embodiment, and various modifications and substitutions may be made within a range not departing from the gist of the present invention.

What is claimed is:

1. A vehicle control device comprising:
a processor that executes instructions to:
recognize a peripheral status of a host vehicle; and
control one or both of steering and speed of the host vehicle on the basis of the peripheral status or map information,
wherein the processor causes the host vehicle to change lanes from a host vehicle traveling lane in which the host vehicle travels to an adjacent lane adjacent to the host vehicle traveling lane,
the processor performs a lane change by using one or more of a first lane change operation and a second lane change operation that is different from the first lane change operation,
wherein the first lane change operation comprises determining whether an execution condition of lane change is satisfied when an intention of an occupant of the host vehicle to change the lane is received, and in response to the execution condition being satisfied, maintaining control of the host vehicle until the host vehicle completes the lane change,
wherein the second lane change operation comprises continuously determining, on the basis of a result of recognition of the peripheral status, whether the execution condition for the lane change has been satisfied, after the execution condition has been satisfied, and when one of being instructed by the occupant or without depending on being instructed by the occupant, the lane change is planned and control is maintained until the host vehicle completes the lane change, and
when the host vehicle is unable to complete the lane change during the first lane change operation, the host vehicle resumes traveling in the host vehicle traveling lane for a first period determined as a distance or a time measured from a first time at which the host vehicle was unable to complete the lane change while executing the second lane change operation, suppressing sending an inquiry to the occupant about whether to perform the lane change and prohibiting performance of a subsequent lane change from the host vehicle traveling lane to the adjacent lane without depending on an instruction from the occupant.

2. The vehicle control device according to claim 1, wherein the second lane change operation includes a first control to execute the lane change when an instruction to initiate lane change is received from the occupant of host vehicle after the lane change of the vehicle is planned, and a second control to execute the lane change without receiving the instruction from the occupant of the host vehicle after the lane change of the host vehicle is planned.

3. The vehicle control device according to claim 1, wherein, in a case that the host vehicle is traveling in a middle of three lanes that are oriented in a same direction and another lane change to another lane present in a direction opposite to an adjacent lane to which a lane change is stopped is performed on the basis of a position of the host vehicle, the processor makes a period between stopping the lane change to that adjacent lane and starting the lane change to the another lane is shorter than the first period when it is possible to start the lane change again to the adjacent lane where the lane change was stopped.

4. The vehicle control device according to claim 1, wherein, when a reason for changing lanes to the adjacent lane is guidance to a destination, the processor makes the first period shorter than in the case of another reason.

5. The vehicle control device according to claim 1, wherein, when a lane change from the host vehicle traveling lane of the host vehicle to the adjacent lane by the first lane change operation is completed, the processor suppresses the lane change by the second lane change operation within a second period shorter than the first period from a time of a completion of the lane change.

6. The vehicle control device according to claim 1, wherein the processor changes the first period on the basis of a reason why changing lanes is stopped.

7. The vehicle control device according to claim 1, wherein, when the lane change is unsuccessful, the processor notifies the occupant of a reason why the lane change was unsuccessful, and notifies the occupant the second lane change operation cannot be executed until the first period has elapsed.

8. A vehicle control method comprising:
by an in-vehicle computer,
recognizing a peripheral status of a host vehicle;
controlling one or both of steering and speed of the host vehicle on the basis of the peripheral status or map information;
causing the host vehicle to change lanes from a host vehicle traveling lane in which the host vehicle travels to an adjacent lane adjacent to the host vehicle traveling lane; and
performing a lane change by using one more of a first lane change operation and a second lane change operation that is different from the first lane change operation;
wherein the first lane change operation comprising determining whether an execution condition of a lane change is satisfied when an intention of an occupant of the host vehicle to change the lane is received, and in response to the execution condition being satisfied, maintaining control of the host vehicle until the host vehicle completes the lane change,
wherein the second lane change operation comprises continuously determining, on the basis of a result of the recognition of the peripheral status, whether the execution condition for lane change has been satisfied, and when one of being instructed by the occupant or without depending on being instructed by the occupant, once the execution condition has been satisfied, the lane change is planned and control of the host vehicle is maintained until the host vehicle completes the lane change, and when the host vehicle is unable to complete the lane change during the first lane change operation, the host vehicle resumes traveling in the host vehicle travelling lane for a first period determined as a a distance or a time measured from a first time at which the host vehicle was unable to complete the lane change while executing the second lane change operation, suppressing sending an inquiry to the occupant about whether to perform the lane change and prohibiting performance of a subsequent lane change from the host vehicle traveling lane to the adjacent lane without depending on an instruction from the occupant.

9. A computer-readable non-transitory storage medium that stores a program causing an in-vehicle computer to execute recognizing a peripheral status of a host vehicle;

controlling one or both of steering and speed of the host vehicle on the basis of the peripheral status or map information;

causing the host vehicle to change lanes from a host vehicle traveling lane in which the host vehicle travels to an adjacent lane adjacent to the host vehicle traveling lane; and performing a lane change by using one or more of a first lane change operation and a second lane change operation that is different from the first lane change operation;

wherein the first lane change operation comprises determining whether an execution condition of the lane change is satisfied when an intention of an occupant of the host vehicle to change lane is received, and in response to the execution condition being satisfied, maintaining control of the host vehicle until the lane change is complete, wherein the second lane change operation comprises continuously determining, on the basis of a result of the recognition of the peripheral status, whether the execution condition for the lane change has been satisfied, once the execution condition is satisfied, and when one of being instructed by the occupant or without depending on being instructed by the occupant, the lane change is planned and control of the host vehicle is maintained until the host vehicle completes the lane change, and when the host vehicle is unable to complete the lane change during the first lane change operation, the host vehicle resumes traveling in the host vehicle traveling lane for a first period determined as a distance or a time measured from a first time at which the host vehicle was unable to complete the lane change while executing the second lane change operation, suppressing sending an inquiry to the occupant about whether to perform the lane change and prohibiting performance of a subsequent lane change from the host vehicle traveling lane to the adjacent lane without depending on an instruction from the occupant.

\* \* \* \* \*